A. B. FOANS.
TOY VEHICLE.
APPLICATION FILED MAY 13, 1920.

1,362,407.

Patented Dec. 14, 1920.

WITNESS:
William Miller

INVENTOR.
Andrew B. Foans
BY
Hauff & Garland
ATTORNEYS

UNITED STATES PATENT OFFICE.

ANDREW B. FOANS, OF NEW YORK, N. Y.

TOY VEHICLE.

1,362,407.    Specification of Letters Patent.    Patented Dec. 14, 1920.

Application filed May 13, 1920. Serial No. 381,126.

*To all whom it may concern:*

Be it known that I, ANDREW B. FOANS, a citizen of the United States, residing at New York, in the county of New York and State of New York, have invented new and useful Improvements in Toy Vehicles, of which the following is a specification.

This invention relates to a toy vehicle which combines a seat for a child to propel the vehicle by shuffling the feet along the ground, and a platform brought into use when it is desired to stand.

The invention is designed to include means for readily converting the vehicle, either to provide a seat for the child or to move the seat out of the way, and bring the the platform into action for the child to stand on.

An object of the invention is to construct a seat made to be swung upward to uncover the platform and at the same time serve as a hand grip to steer the vehicle.

The invention is more fully described in the following specification and claims, reference being made to the accompanying drawing in which:

Figure 1:
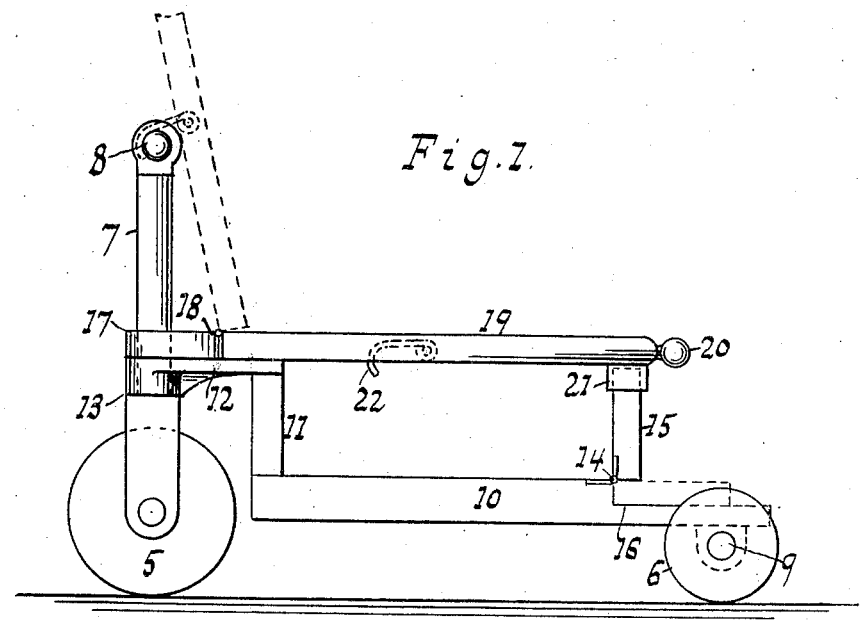
Figure 1 represents a side elevation of a vehicle embodying this invention.
Figure 2:
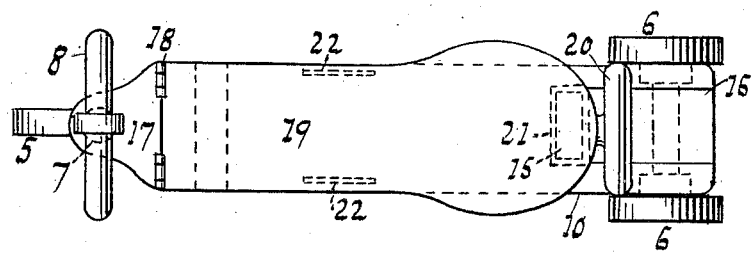
Fig. 2 is a plan view of the same.
Figure 3:
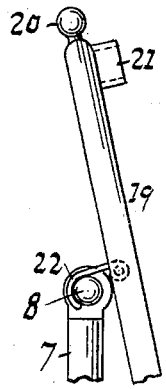
Fig. 3 is a detail side elevation of the upper part of the steering post showing the seat swung up.

In the drawing the numeral 5 designates the front and 6 are the rear wheels adapted to roll along the ground. The front wheel or wheels support a steering post 7 having a handle bar 8 for the child to grip while sitting and thus steer the vehicle. On the axle 9 of the rear wheels is mounted a platform 10 extending forward and having a post 11 connected by a bracket 12 to the steering post. The bracket has an eye or hole to set loosely about the stem and the lower portion is supported on a shoulder 13 of the steering post. This construction holds the forward part of the platform rigid, while the rear part is supported on the rear wheels.

At the rear of the platform is hinged at 14 a post or brace 15 which can be swung backward when desired to rest in a recess 16 located in the platform. On the bracket 12 is arranged a short board member 17 having a hole to set loosely about the steering post. Hinged at 18 to the rear of the board is a seat 19 having a handle 20 fixed to the rear of the seat.

The seat when in the position shown in Fig. 1 has its rear portion braced by being supported on the rear hinged post. The lower portion of the seat is provided with a rectangular sleeve 21 to form a socket for the upper end of the post and eliminate disengagement or movement of the seat relative to the post. On the bottom of the seat is swingingly mounted a pair of hooks 22 made to at times engage the handle.

When it is desired to stand on the platform, the seat is swung upward to rest against the steering post and the hooks are made to embrace the handle bar as indicated in dotted lines in Fig. 1. The rear post being released by the lifting of the seat will turn backward and be housed in the recess in the platform. The child can then stand on the uncovered platform to push the car forward with the feet coacting with the ground, while the child grasps the handle 20 on the rear of the seat and actuation of the handle oscillates the bar to turn the car in any direction. In this device the seat and its connections with the steering post will oscillate while the hooks are locked with the handle bar.

I claim:

1. A toy vehicle comprising a plaftorm, wheels for supporting the platform, a steering post connected to one of said wheels, a seat mounted on the steering post above the platform, and means for swinging the seat upward to uncover the platform.

2. A toy vehicle comprising a platform, front and rear wheels for supporting the platform, a steering post connected to the front wheel, a seat connected to the steering post, and means for swinging the seat upward to rest against the steering post.

3. A toy vehicle comprising a platform, front and rear wheels for supporting the platform, a steering post having a handle bar connected to the front wheel, a seat with a handle connected to the steering post, and means for swinging the seat upward to rest against the steering post with the handle above the steering post handle.

4. A toy vehicle comprising a platform, front and rear wheels for supporting the platform, a steering post having a handle bar connected to the front wheel, a seat with a handle connected to the steering post, means for swinging the seat upward to rest against the steering post with the handle above the steering post handle, and means carried by the seat engaging the handle bar to oscillate the steering post.

5. A toy vehicle comprising a platform having a rear post swingingly connected to the platform, front and rear wheels for supporting the platform, a steering post carried by the front wheel, and a seat hinged to the steering post supported on the swinging post.

6. A toy vehicle comprising a platform having a rear post swingingly connected to the platform, front and rear wheels for supporting the platform, a steering post carried by the front wheel, and a seat hinged to the steering post supported on the swinging post the seat being at times raised to an inclined position to clear the platform for standing room.

In testimony whereof I have hereunto set by hand in the presence of two subscribing witnesses.

ANDREW B. FOANS.

Witnesses:
SAMUEL LEWIS,
WILLIAM MILLER.